United States Patent
Hanson et al.

(10) Patent No.: US 6,527,871 B1
(45) Date of Patent: *Mar. 4, 2003

(54) WET WEATHER VISION IMPROVEMENT SYSTEM AND METHOD FOR VIDEO AND TELEVISION CAMERA, AND OTHER VIEWING AND IMAGING EQUIPMENT

(76) Inventors: Brian P. Hanson, 6213 Frontier Dr., Springfield, VA (US) 22835; David H. Hanson, 314 S. Fillmore St., Arlington, VA (US) 22204; Stanislav Torgovitsky, 4712 Asbury Pl. N.W., Washington, DC (US) 20016

(*) Notice: Subject to any disclaimer, the term of this patent is extended or adjusted under 35 U.S.C. 154(b) by 0 days.

This patent is subject to a terminal disclaimer.

(21) Appl. No.: 09/658,457

(22) Filed: Sep. 8, 2000

Related U.S. Application Data

(63) Continuation of application No. 09/564,206, filed on May 4, 2000.

(51) Int. Cl.[7] .............................. B08B 3/02; B08B 5/00; B08B 5/02

(52) U.S. Cl. ............................. 134/37; 134/18; 134/42; 15/316.1

(58) Field of Search ............................. 134/21, 18, 37, 134/42; 15/301, 312.1, 312.2, 314, 316.1, 405

(56) References Cited

U.S. PATENT DOCUMENTS

| | | | | |
|---|---|---|---|---|
| 3,469,088 A | * | 9/1969 | Coleman et al. | 134/34 |
| 4,851,866 A | * | 7/1989 | Ciarlei et al. | 348/75 |
| 5,097,563 A | * | 3/1992 | Cowan | 15/313 |
| 5,140,719 A | * | 8/1992 | Cowan | 15/313 |
| 5,394,184 A | * | 2/1995 | Anderson et al. | 348/151 |
| 5,419,005 A | * | 5/1995 | Mori | 15/313 |
| 5,486,139 A | * | 1/1996 | Papp | 454/123 |
| 6,077,361 A | * | 6/2000 | Glenn | 134/21 |

* cited by examiner

*Primary Examiner*—Zeinab El-Arini
(74) *Attorney, Agent, or Firm*—Sughrue Mion, PLLC

(57) ABSTRACT

A moisture and build up removal system and method which deliver air at high velocity to the surface of a lens or a lens shield. The system and method having a particular implementation with lens surfaces of video, photographic, image viewing, and image processing devices.

20 Claims, 6 Drawing Sheets

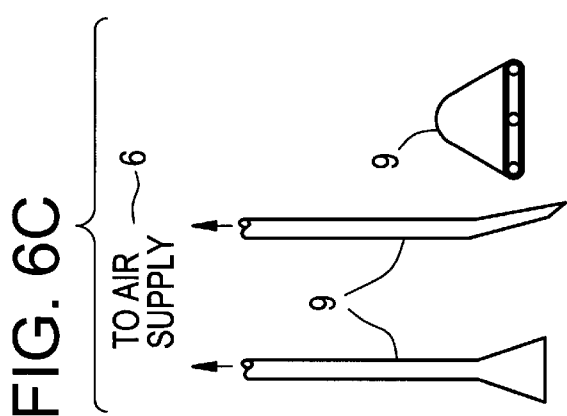
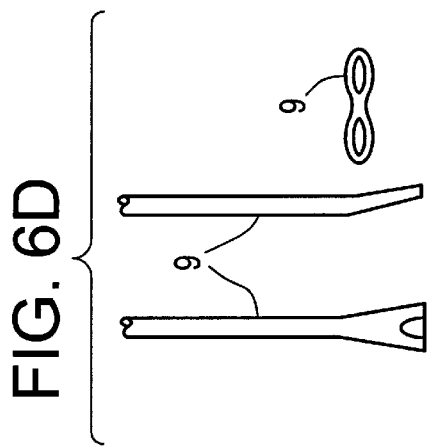
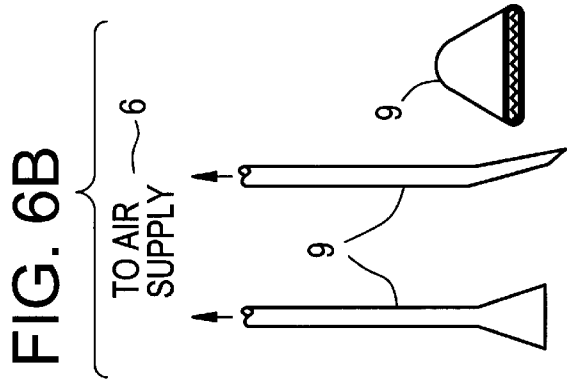
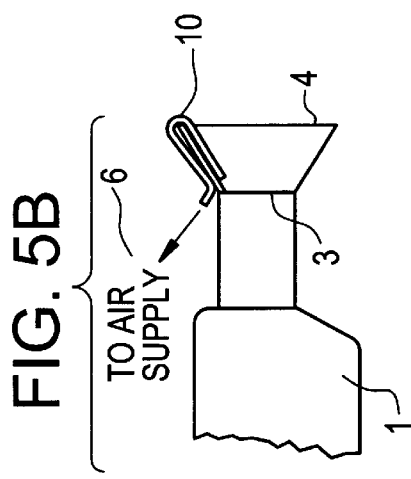
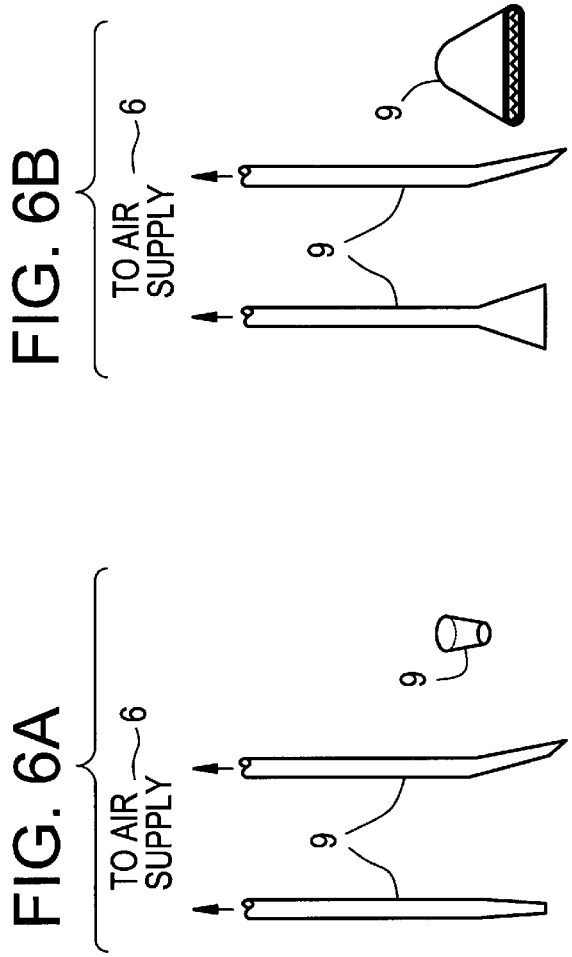
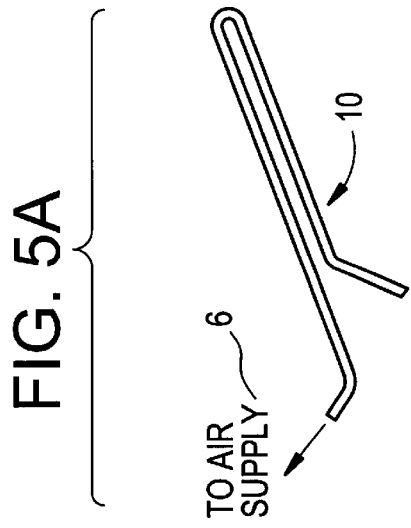

AIR OUTLET

AIR OUTLET

INLET FOR AC

AIR OUTLET

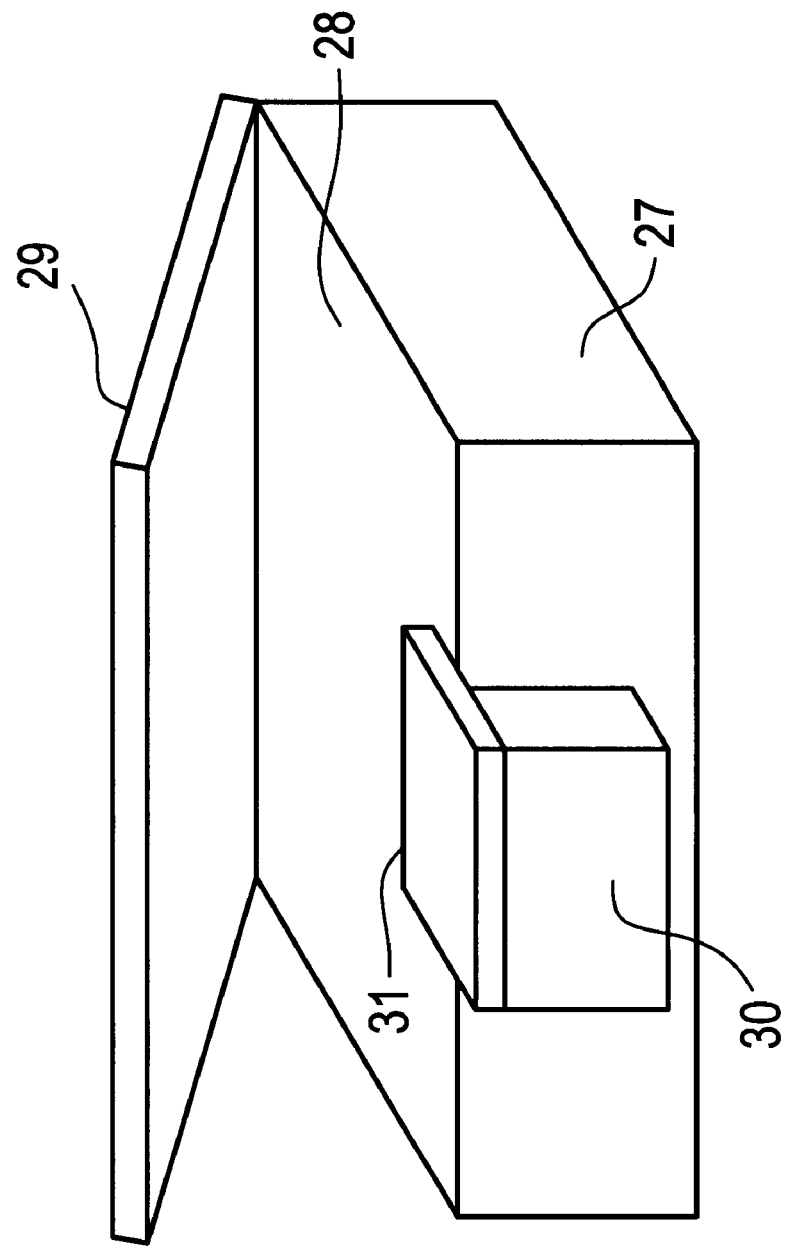

WET WEATHER VISION IMPROVEMENT SYSTEM AND METHOD FOR VIDEO AND TELEVISION CAMERA, AND OTHER VIEWING AND IMAGING EQUIPMENT

This application is a Continuation in Part of U.S. patent application Ser. No. 09/564,206 filed on May 4, 2000. The disclosure of the U.S. patent application Ser. No. 09/564,206 is incorporated herein by reference.

FIELD OF THE INVENTION

The invention concerns an apparatus and a method for removing view-obstructing materials from a surface of lenses of video cameras and other photographic, viewing and imaging equipment.

BACKGROUND OF THE INVENTION

During filming, photographing, or assisted viewing (e.g., through binoculars) of events that take place in wet and/or windy weather conditions, serious image degradation occurs due to a combination of rain, and/or other precipitation and debris, that fall and/or accumulate on the lens' surface of video and other imaging/viewing equipment.

Conventional solutions include clear plastic covers, and umbrella-like arrangements are conventionally employed. Such conventional remedies are often inefficient, cumbersome, and not very effective especially in extreme wet-weather and windy/dusty conditions.

During use of imaging equipment, such as copiers, scanners, etc., where image quality depends on having an unobstructed view of the image to be reproduced, the transparent copying/scanning surface which covers a lens, and through which the image to be reproduced is viewed, often becomes contaminated by dust and other view-obstructing particles.

Conventional remedies, such as wiping with a cleaning solution, while sometimes necessary, are often time consuming, inefficient, and add to the cost (e.g., cleaning solution, wipes, etc.) of operating imaging equipment.

SUMMARY OF THE INVENTION

The invention solves the above-identified problems by providing a system and a method capable of removing image-degrading moisture, debris, or build-up, from a lens surface, or from a transparent surface (which may be used as a shield, cover, etc, placed between the lens and the image, hereinafter referred to as a "lens shield surface"), which is exposed and/or is susceptible to moisture, or build-up, by delivering air to the lens surface (or lens shield surface) at a sufficiently high velocity to remove and/or prevent formation of the image-degrading moisture, debris, and/or build-up. The inventive system is arranged such than the image is not adversely affected at any time during the moisture or build-up removal, Also, the inventive system requires minimal, if any, action on the part of the user of the system to perform the moisture or built-up removal.

DESCRIPTION OF THE DRAWINGS

FIGS. 5a and 5b. Show a side view of an embodiment of the inventive device which has "self-clipping" air delivery nozzle(s).

FIGS. 6a–6d. Show various air delivery nozzle shapes and configurations in accordance with the invention.

FIG. 9. Shows an example of an inventive system suitable for use with imaging equipment such as copiers, scanners, etc.

DETAILED DESCRIPTION

The following is a detailed description of an inventive device and method for removing water and other view obstructing material(s) from lenses and lens shields of photographic and video cameras and equipment. The inventive device and method are particularly suited for removing such view obstructing material during operation of the photographic and video cameras (e.g., during filming) in inclement weather conditions such as rain, snow, etc.

Figure 1:
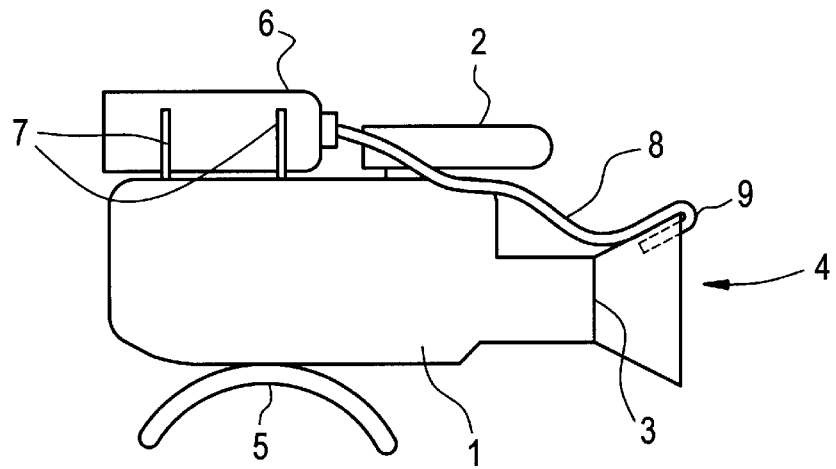
FIG. 1. Shows a side view of video camera with an example of the inventive device attached thereto.
Figure 2:
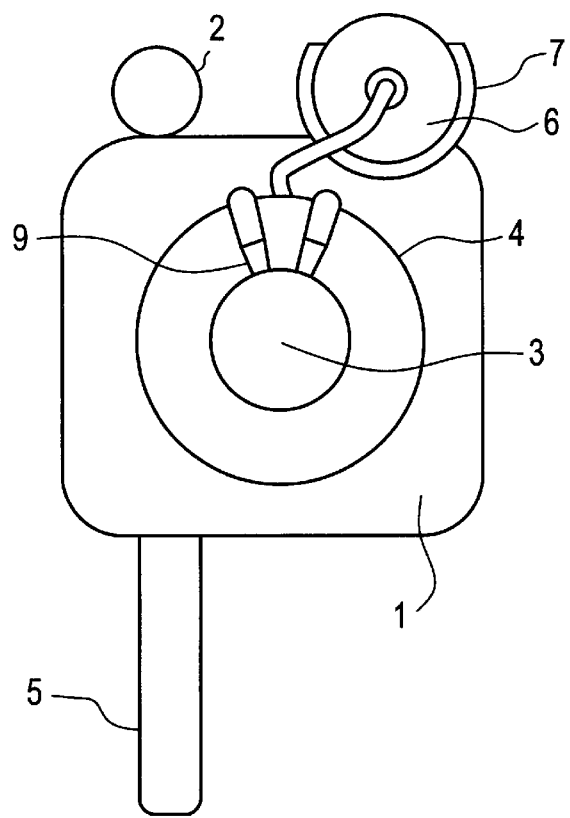
FIG. 2. Shows a front view of the video camera shown in FIG. 1, and illustrates and example of the placement of the inventive device with respect to the lens of the video camera.
Figure 3:
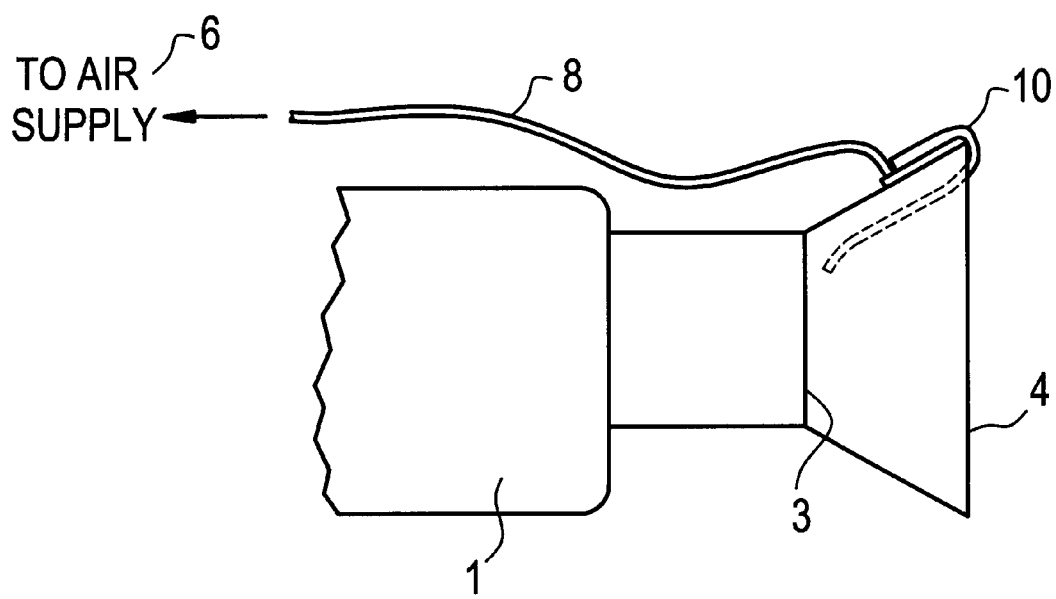
FIG. 3. Shows an example of an arrangement for attaching the air delivery nozzles of the inventive device to a video camera.

An essential feature of the contemplated device and method is on-demand delivery of compressed air, $CO_2$, or other suitable gas, to lens surface or shield surface. In accordance with an advantageous embodiment of the invention, as illustrated in FIG. 1, the air (or other gas) is to be delivered from an air supply 6 through a connecting, preferably flexible, feed line 8, to a directional, preferably adjustable, nozzle 9 (or multiple nozzles) which is attached to the lens funnel 4 (which is a cover, also referred to as a "flare", often used to block unwanted light, etc,). The nozzle 9 is attached so that the air delivered to the lens surface 3 or lens shield surface) is sufficient to remove the view obstructing material, and so that the nozzle 9 does not interfere with the desired viewing area of the lens 3, as illustrated in FIG. 2. In an advantageous embodiment of the invention, the air nozzle forms a clip-with-jet-attached 10, thereby making air nozzle 9 self-clipping to lens funnel 4, as shown in FIGS. 3, 5a and 5b.

Figure 4:
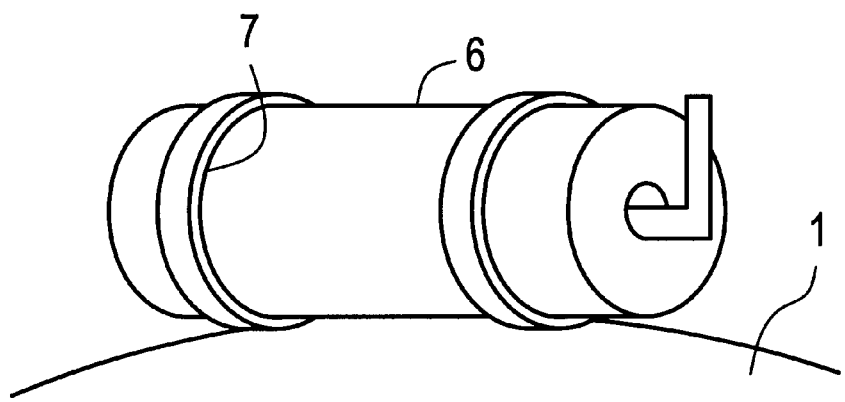
FIG. 4. Shows an example of a mounting arrangement for attaching an air supply of the inventive device to a video camera.
Figure 7C:
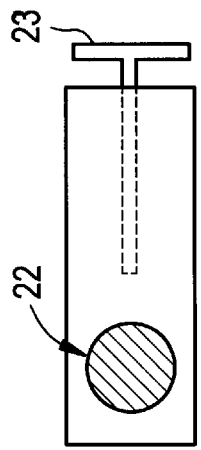
FIGS. 7a–7d. Show an inventive adapter for use with certain air supplies which may be employed with the inventive device.
Figure 7B:
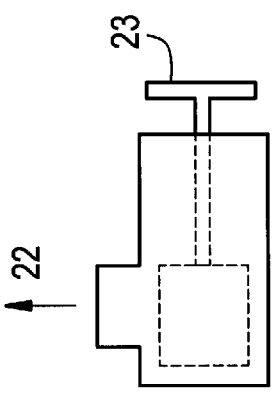
Figure 7D:
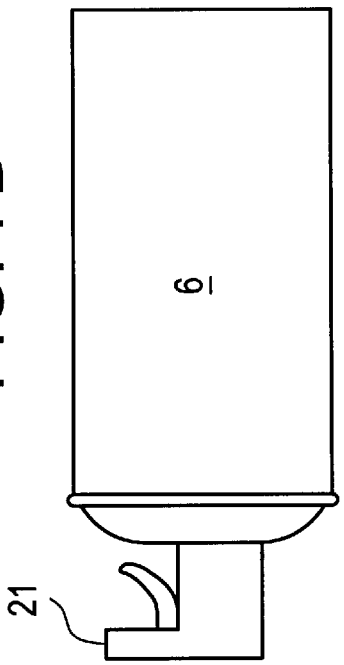
Figure 7A:
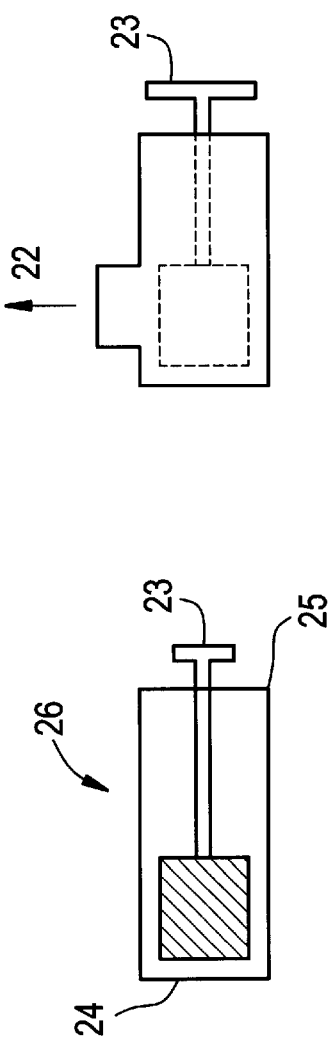
Figure 8A:
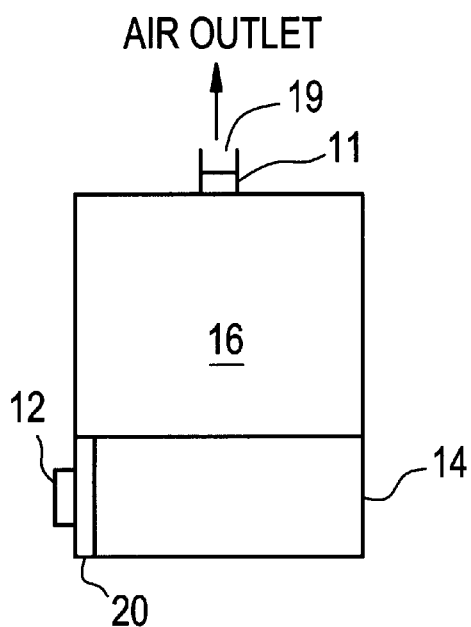
FIGS. 8a–8c. Show examples of inventive air delivery control mechanisms for use in the inventive device.
Figure 8B:
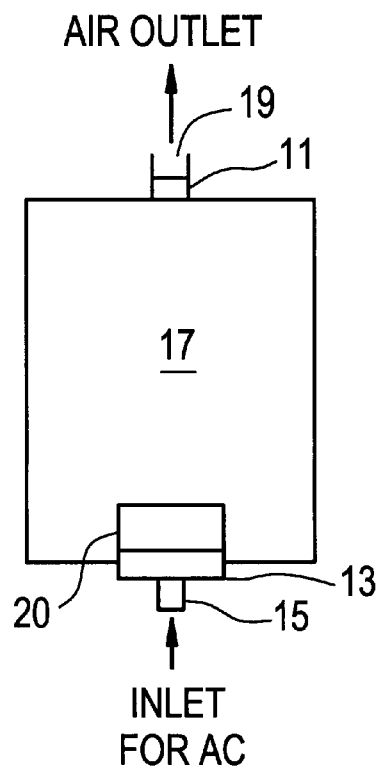
Figure 8C:
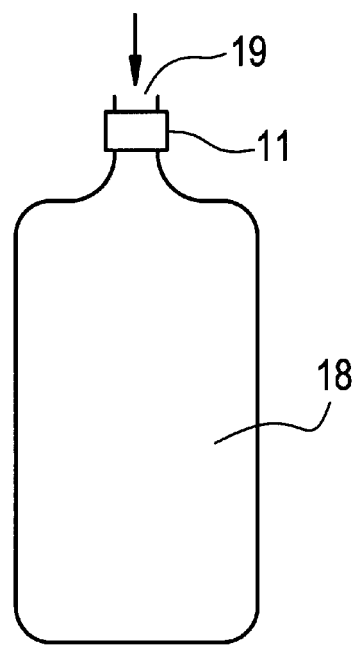

FIGS. 1 and 2 also illustrate an example of how the above-described components may be arranged with respect to other typical camera components such as microphone 2 and shoulder rest 5 which are mounted to video camera body 1. Conventional off-the-shelf products, such as suitable air compressors, air pumps, and compressed air containers (e.g. aerosol cans) can be used as sources of compressed air to be connected to feed line 8 as air supply 6 (not shown) as illustrated in FIG. 3. However, in accordance with a particularly advantageous embodiment of the invention, an air supply which is to be used is sufficiently portable and self-sufficient (e.g., it does not require an external power source) to be mounted onto the camera body 1 using, for example, mounting clips 7 as shown in FIGS. 1, 2 and 4. Such mounting clips 7 maybe integrally formed on the camera body 1, or be removably attached thereto. In addition, such "clips" maybe tailor-made to suit the shape and size of a particular air supply 6. Yet another particularly advantageous embodiment of the invention, includes an air delivery regulator. Examples of such a regulator are shown in FIGS. 8A–8C, and include, but are not limited to, (1) a control release valve 11 formed either on the air outlet 19 or on the feed line 8, or (2) a power switch 12 or 13 for connecting and disconnecting power source, such as battery 14, or AC power supplied at inlet 15 of the air compressor or air pump 16/17, which switch 12/13 may include (3) a timing mechanism 20 for automatic operation. Of course, it will be readily appreciated that any of the above-mentioned regulators can be used in various combinations. Furthermore, the above-mentioned regulators may be mounted a location convenient to camera operator so that they do not interfere with normal camera operation.

Finally, the shape and placement of the nozzle, as well as the number of the nozzles to be used may be varied/adjusted depending on factors such as, lens shape, weather conditions, output characteristics of an air source. In a particularly advantageous embodiments the nozzles are removably attached to feed line 8, so that a camera operator can easily replace the nozzles on demand. Various shapes and cross/sectional areas for nozzles which may be used in the inventive device, and in accordance with the inventive method are shown in FIGS. 6A–6D.

In some applications, air supply 6 may require use of an adapter to properly connect the air supply to feed line 8. In particular, an air supply having a square exit port 21 may need to be connected to a round supply tube 22 as shown in FIGS. 7a–7d. In such a case an inventive adapter 26 having an adapter body 25, a tightening screw 23, a square inlet for receiving the square port 21 of air supply 6, and a round exit port for receiving round supply tube 22 is advantageously employed. The tightening screw 23 is tightened to ensure essentially air tight fit of the adapter 26 and exit port 21.

FIG. 9 illustrates an embodiment of the inventive system to be used with imaging devices such as copiers and scanners. In such a system, an air supply 30 (which may be constituted by any of the air supplies described above) is attached to, or integrally formed with, copier/scanner body 27 (which may have a lid 29), and air outlet(s) 31 are positioned to direct air flow from the air supply 31 onto scanning copying surface 28. In this embodiment of the invention, supply tube(s) may be used if the air supply 30 is positioned at a distance from air outlet(s) 31. Furthermore, any of the regulators illustrated in FIGS. 8a–8c may be used in the inventive system as illustrated in FIG. 9.

While various implementations of the inventive system in the field of video, photographic and/or imaging devices have been described in detail, a skilled artisan will readily appreciate that numerous other applications and variations of the nozzle system and/or air supply are possible without departing from the spirit of the invention. Accordingly, the scope of the invention is defined by the claims set forth below.

I claim:

1. A moisture and build up removal system comprising:
    at least one air jet nozzle arranged with respect to an outer weather exposed light receiving surface of a lens, wherein said lens is integrally, or removably, formed in a body of an image processing device and said image processing device is any one of a video camera, a copier, a photographic camera, a telescope or binoculars;
    an air supply; and
    an air delivery system, connected to said air supply and said air jet nozzle, which delivers air from said air supply to said air jet nozzle at a velocity sufficient to push said moisture and/or build up off of an area of said surface required for an unobstructed image.

2. A moisture and build up removal system as claimed in claim 1, wherein said air jet nozzle is positioned outside of image viewing area of said lens surface.

3. A moisture and build up removal system as claimed in claim 1 wherein said air delivery system comprises a feed line connecting said nozzle to said air supply.

4. A moisture and build up removal system as claimed in claim 3 wherein said feed line is removably attached to said nozzle and to said air supply.

5. A moisture and build up removal system as claimed in claim 3 wherein said feed line is removably attached to said air supply via an adapter, said adapter providing essentially air-tight connection between said air supply and said feed line.

6. A moisture and build up removal system as claimed in claim 5 wherein said air supply has an air outlet with a cross-section different from a cross-section of said feed line.

7. A moisture and build up removal system as claimed in claim 1 wherein said lens has a funnel-shaped cover, and said jet nozzle is attached to said cover.

8. A moisture and build up removal system as claimed in claim 7 wherein a portion of said nozzle is essentially U-shaped to removably clip said portion onto said cover.

9. A moisture and build up removal system as claimed in claim 1 comprising a plurality of air jet nozzles, wherein said air delivery system connects said jet nozzles to said air supply.

10. A moisture and build up removal system as claimed in claim 1 wherein said air jet nozzles are placed in close proximity to said surface of said lens without obstructing any portion of said surface.

11. A moisture and build up removal system as claimed in claim 1 wherein said lens surface is covered by a transparent protective shield and said air jet nozzles are placed in close proximity to a surface of said shield without obstructing any portion of said lens surface.

12. A moisture and build up removal system as claimed in claim 1 further comprising a control release valve for selectively shutting off air to said nozzles from said air supply.

13. A moisture and build up removal system as claimed in claim 1 wherein said air supply is a compressed gas container.

14. A moisture and build up removal system as claimed in claim 1, wherein said system further comprises at least one clip removably attached to said body of said image processing device for securing said air supply to said body.

15. A moisture and build up removal system as claimed in claim 1, wherein said lens is integrally formed in a body of an image processing device, said system further comprising at least one clip fixedly attached to said body of said image processing device for securing said air supply to said body.

16. A moisture and build up removal system as claimed in claim 1, wherein said air supply is an electrically powered air pump or an air compressor, said system further comprising a switch for selectively turning off electric power to said air pump or air compressor.

17. A moisture and build up removal system as claimed in claim 16, wherein said switch is remotely-mounted with respect to said air supply.

18. A moisture and build up removal system as claimed in claim 1, wherein said tens is integrally formed in a body of an image processing device, said image processing device is a copier or a scanner, said lens surface is located under a transparent surface for receiving images to be scanned or copied, said nozzles are placed in close proximity to said surface for receiving images to be scanned or copied without obstructing any portion of said lens surface.

19. A method for removing, and for preventing accumulation of, moisture and/or build up on a surface, thereby keeping the view through said surface unobstructed by said moisture and/or build up, said method comprising the steps of:

positioning at least one air jet nozzle with respect to said surface, said surface being an outer weather exposed transparent image receiving surface of an image processing device which includes a lens, said image processing device being any one of a video camera, a copier, a photographic camera, a telescope or binoculars;

generating air at a velocity sufficient to remove said moisture and/or buildup from said surface; and delivering said air to said air jet nozzle, thereby applying said air to said surface at a velocity sufficient to push said moisture and/or build up off of an area of said surface required for an unobstructed image.

20. A method for removing, and for preventing accumulation of, moisture and/or build up on a surface according to claim 19, wherein said lens is integrally formed in said image processing device.

\* \* \* \* \*